United States Patent
Quiroz de la Mora

(10) Patent No.: US 10,739,585 B2
(45) Date of Patent: Aug. 11, 2020

(54) SIDE HEAD UP DISPLAY

(71) Applicant: Continental Automotive Systems, Inc., Auburn Hills, MI (US)

(72) Inventor: Luis Ernesto Quiroz de la Mora, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 378 days.

(21) Appl. No.: 15/202,718

(22) Filed: Jul. 6, 2016

(65) Prior Publication Data

US 2018/0011314 A1 Jan. 11, 2018

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *B60K 2370/172* (2019.05); *B60K 2370/179* (2019.05); *B60K 2370/186* (2019.05); *G02B 2027/0141* (2013.01)

(58) Field of Classification Search
None
See application file for complete search history.

(56) References Cited

U.S. PATENT DOCUMENTS

| | | | | |
|---|---|---|---|---|
| 2010/0020169 A1* | 1/2010 | Jang | ....................... | G01C 21/36 348/115 |
| 2012/0268262 A1* | 10/2012 | Popovic | ................. | B60Q 9/008 340/438 |
| 2016/0150218 A1* | 5/2016 | Yoon | .................... | H04N 13/204 348/77 |
| 2017/0246956 A1* | 8/2017 | Hall | ....................... | B60K 35/00 |
| 2017/0313248 A1* | 11/2017 | Kothari | .................. | B60K 35/00 |

* cited by examiner

*Primary Examiner* — James M Anderson, II

(57) ABSTRACT

A side head-up display system is provided. The side head-up display system has an image generator configured to emit a generated image to create a virtual image for viewing by a vehicle occupant. In some forms, a side display surface is disposed along a vehicle side of the motor vehicle, and the virtual image is viewable through the side display surface. In some versions, a controller is provided and configured to cause the generated image to be generated intermittently while the first motor vehicle is running so that the image generator is off at least part of the time while the motor vehicle is running. The controller may be configured to cause the image generator to create the generated image to show information about another vehicle outside of the motor vehicle, such as speed information and/or distance and location information.

14 Claims, 7 Drawing Sheets

SIDE HEAD UP DISPLAY

FIELD

The present disclosure relates to see-through displays, such as head-up displays (HUD), for presenting a virtual image to an occupant on a transparent or translucent surface.

BACKGROUND

The trend toward automatic driving includes adding more and more safety features to a vehicle. To increase safety, modern vehicles typically include a see-through display, such as a head-up display, in a passenger cabin to communicate information to an operator of the vehicle. The information can include a vehicle condition such as a fuel level or velocity of the vehicle, as well as warning icons, known as tell-tales. Typical head-up displays project an image including the information onto a predetermined area of a display screen adjacent to a front windshield or that is part of the front windshield. A virtual image is formed that the driver sees projected out over the road or another object on the road outside of the vehicle.

The information conveyed by a head up display is typically provided in the line of sight on the driver on or through the front windshield. Only so much information can be disposed in this front area. Accordingly, there exists a need to provide information to drivers in other ways to increase safety.

SUMMARY

The present disclosure provides a side head-up display system that provides head-up display information on one or both sides of the vehicle, which is viewable through a side window of the motor vehicle.

In one variation, which may be combined with or separate from the other variations described herein, a side head-up display system for a motor vehicle having a front windshield and a pair of vehicle sides, each vehicle side being disposed at an angle with respect to the front windshield, is provided. The side head-up display system includes an image generator configured to emit a generated image for viewing by a vehicle occupant. A side display surface is disposed along a vehicle side of the pair of vehicle sides. A virtual image based on the generated image is viewable through the side display surface.

In another variation, which may be combined with or separate from the other variations described herein, a side head-up display system for a first motor vehicle is provided. The side head-up display system includes an image generator configured to emit a generated image to create a virtual image for viewing by a first motor vehicle occupant. A controller is provided and configured to cause the generated image to be generated intermittently while the first motor vehicle is running so that the image generator is off at least part of the time while the first motor vehicle is running. The controller is configured to cause the image generator to show speed information for a second motor vehicle approaching above a predetermined speed threshold, and the controller is also configured to cause the image generator to show information indicating that a third motor vehicle located ahead of the first motor vehicle is traveling slower than the first motor vehicle.

In yet another variation, which may be combined with or separate from the other variations described herein, a side head-up display system for a motor vehicle has a front windshield and a pair of vehicle sides. The side head-up display system includes an image generator configured to emit a generated image to create a virtual image for viewing by a vehicle occupant through a side window of the motor vehicle. A controller is configured to intermittently turn on and off the image generator so that the virtual image is displayed intermittently while the motor vehicle is running. The controller is configured to cause the image generator to generate the generated image to show information about another vehicle outside of the motor vehicle.

Some variations may also include one or more of the following characteristics, alone or in combination: the controller being configured to cause the image generator to show information indicating that another vehicle is in the blind spot of the first motor vehicle; the controller being configured to cause the image generator to show information indicating that another vehicle is stopped ahead of the motor vehicle; a second image generator configured to emit a second generated image to create a second virtual image for viewing by a vehicle occupant, wherein the second virtual image is based on the second generated image and is viewable through a passenger's side window of the first motor vehicle and the first virtual image is viewable through the driver's side window; the controller being configured to cause the first generated image to be turned on when another vehicle is approaching or ahead of the first motor vehicle on the driver's side of the first motor vehicle; the controller being configured to cause the second generated image to be turned on when another vehicle is approaching or ahead of the first motor vehicle on the passenger's side of the first motor vehicle; the side head-up display further comprising a reflector configured to reflect rays of the generated image toward the side window or side display surface to create the virtual image; the reflector being configured to reflect the rays about 90 degrees; the image generator comprising a thin-film transistor (TFT) display mounted to a picture generation unit (PGU); the side head-up display system further comprising a lens disposed adjacent to the reflector; the lens being configured to permit the rays of the generated image to pass through the lens toward the side display surface; the side display surface having a wedged shape comprising an inner side and an outer side, the inner and outer sides being non-parallel; the side head-up display system further comprising a controller configured to cause the generated image to be generated intermittently while the motor vehicle is running so that the image generator is off at least part of the time while the motor vehicle is running; the controller being configured to cause the image generator to show speed information for another vehicle approaching above a predetermined speed threshold; wherein the predetermined speed threshold depends on a speed of the motor vehicle; the controller being configured to cause the image generator to show information indicating that another vehicle located ahead of the motor vehicle is traveling slower than the motor vehicle; and the virtual image being visible to the vehicle occupant through a portion of the side display surface that is disposed adjacent to an A-pillar and above a rear-view mirror.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

Figure 1:
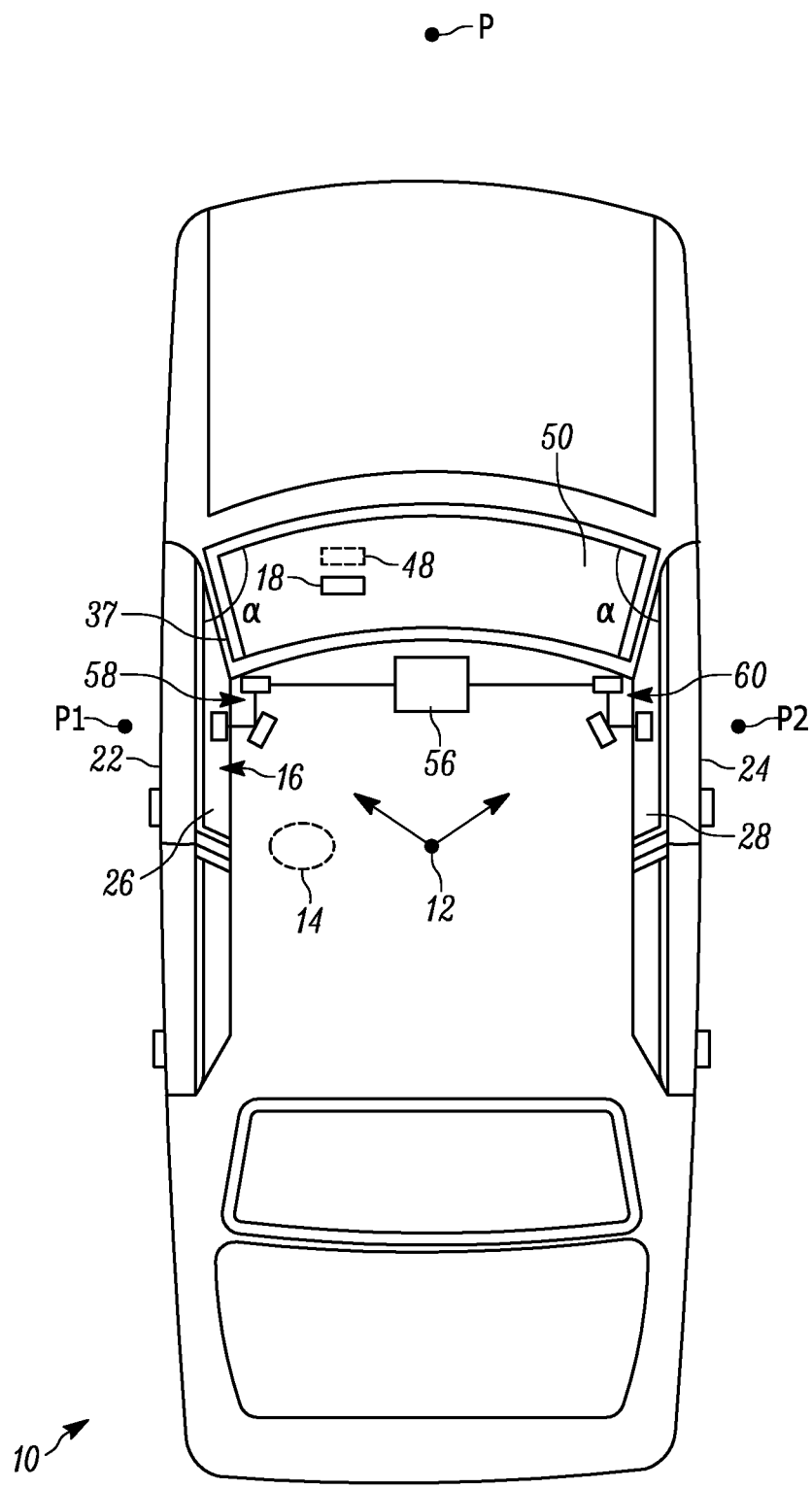
FIG. 1 is a schematic plan view of a motor vehicle including an example side head-up display system, in accordance with the principles of the present disclosure.
Figure 2A:
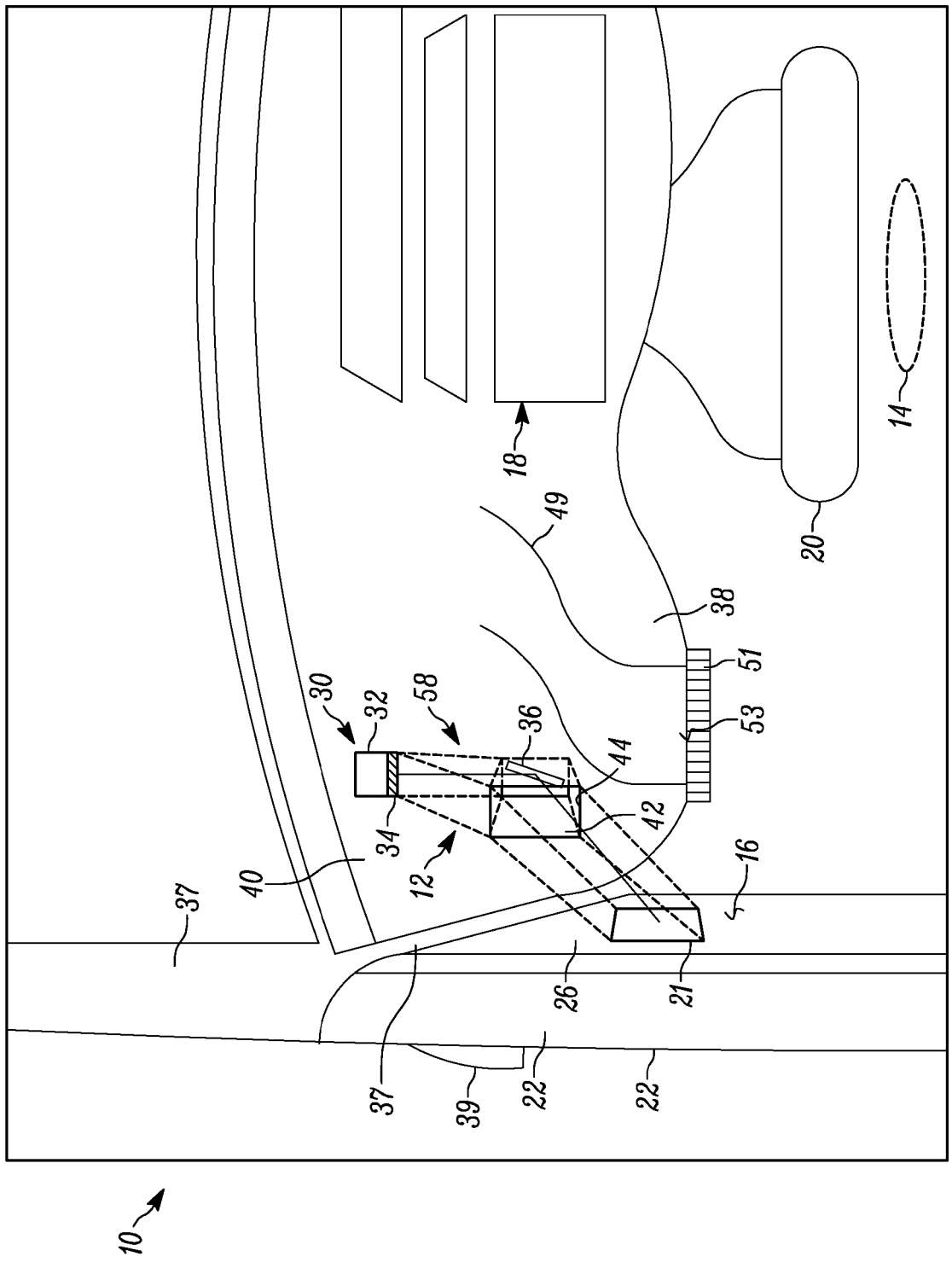
FIG. 2A is a schematic plan view of a portion of the motor vehicle and side head-up display system of FIG. 1, according to the principles of the present disclosure.
Figure 2B:
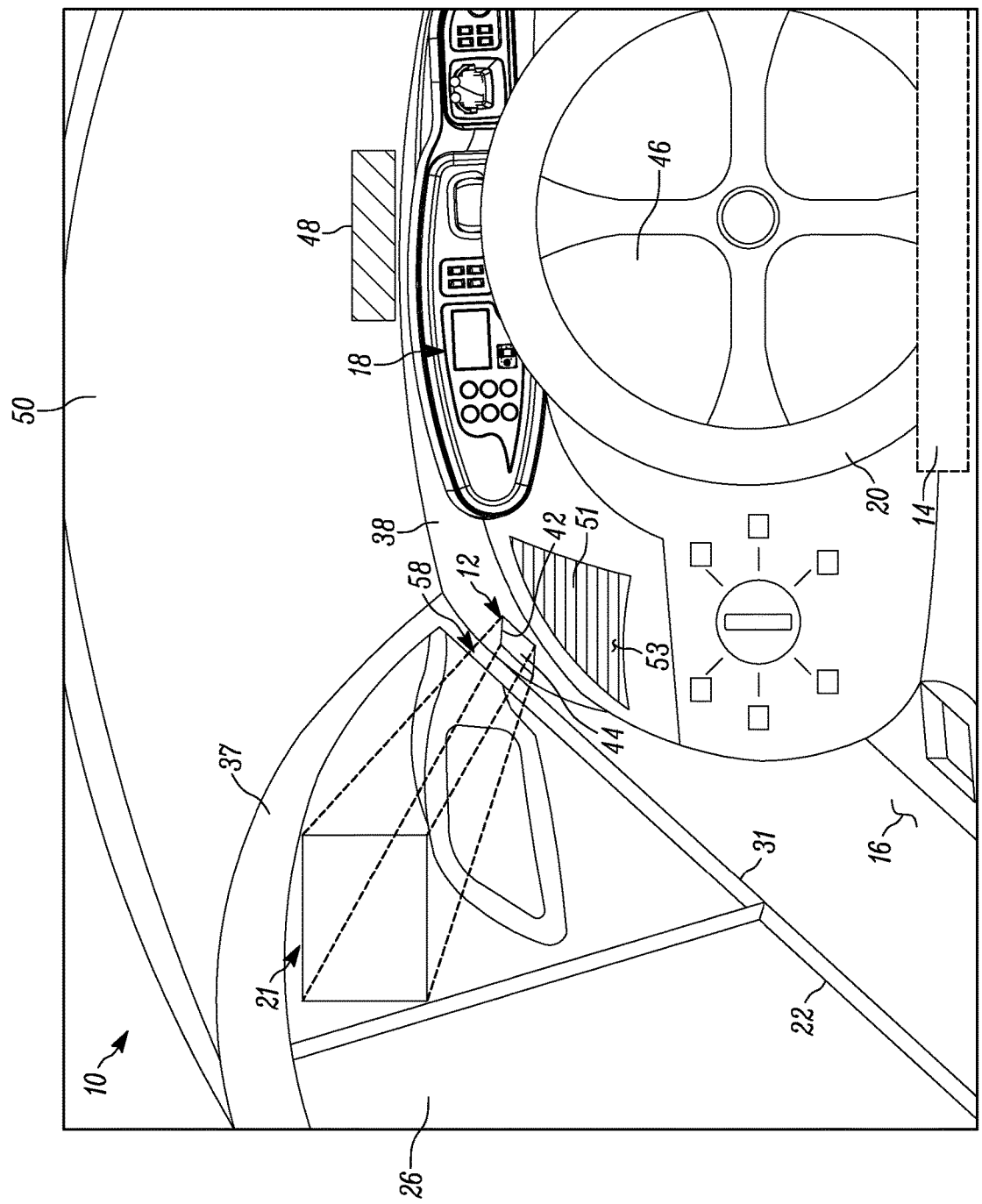
FIG. 2B is a schematic side view, from an interior side, of a portion of the motor vehicle and the side head-up display system of FIGS. 1-2A, in accordance with the principles of the present disclosure.

FIGS. 1, 2A, and 2B schematically illustrate a motor vehicle 10 that has a see-through display system, which is a side head-up display (SHUD or side HUD) system 12. The side head-up display system 12 of the motor vehicle 10 can be any type of system that desires contrast control, such as a night vision system, a land-based HUD, or an aircraft HUD.

In the illustrated example, the side head-up display system 12 provides information or content to an occupant 14 (such as a driver) of the vehicle 10. The side head-up system 12 can be positioned, for example, within a passenger cabin 16 of the motor vehicle 10. A main HUD system 18 is also included in this example, and is positioned, for example, in front of a steering wheel 20. Both the side head-up display system 12 and the main HUD system 18 are operable to display information or content in the form of one or more images or elements of graphics. For instance, the content of the main HUD 18 can include one or more conditions of the vehicle 10, such as fuel level, battery level, odometer readings, velocity or a warning. In other examples, the main HUD system 18 is a multimedia device operable to display content in the form of navigational data, imagery, radio data or a menu for interacting with another system of the vehicle 10 or another system located remotely from the vehicle 10. However, other content is contemplated. The side head-up display system 12 is preferably configured to display information about conditions outside of the vehicle 10, such as speed or location information of other vehicles and/or other surrounding conditions. In some forms, however, the side head up display system 12 may also display information about the vehicle 10, similar to the main HUD system 18.

The main HUD system 18 and the side head-up display system 12 can be in electrical communication, being wired or wirelessly, with another digital system onboard the vehicle 10, such as a backup guidance camera, navigation system, vehicle-to-vehicle communication system, or a vehicle controller operable to perform various system tasks. In other examples, the side head-up display system 12 displays information from a remote system, such as information based on a location of the vehicle 10 such as from outside infrastructure systems.

The main HUD system 18 shows information in the line of sight of the vehicle occupant 14. For example, the main HUD system 18 is operable to project a virtual image in the line of sight of the occupant 14, at a point P outside the vehicle and in front of the vehicle.

The side head-up display system 12, however, is configured to project a side virtual image 21 on the driver's side 22 and/or the passenger's side 24 of the motor vehicle 10. In some cases, the side virtual images 21 are viewable a point outside of the vehicle 10 on the driver's side 22 and/or the passenger's side 24, such as points P1 and P2, respectively. In other cases, the side virtual images 21 are viewable directly on the driver's side window 26 and/or the passenger's side window 28 or on another side display surface.

The side HUD system 12 includes an image generator 30 configured to emit a generated image for eventual viewing by the vehicle occupant 14 (which could be a driver and/or a passenger) in the form of the virtual image 21. The image generator 30 may include a light source and/or picture generating unit (PGU) 32 and a display 34, such as a thin film transistor (TFT) display, which may be backlit with LEDs, to project the generated image, by way of example. The generated image may be projected to a planar or aspherical fold mirror or other reflector 36, which reflects rays of the generated image toward a display surface. The display surface may be a combiner or other display surface, or the display surface may the window 26 or 28 itself. In some variations, the reflector 36 may be omitted and the image generator 30 may project the image directly to the window 26, 28 or other display surface. In the illustrated example, rays of the generated image are reflected about 90 degrees toward the window 26, 28 to create the virtual image 21. Thus, the reflector 36 is oriented at about 45 degrees with respect to a planar surface of the TFT display 34, and the reflector 36 is oriented at about 45 degrees with respect to the window 26, in this example. As shown, the virtual image 21 may be visible to the occupant 14 on or through a portion of the display surface (such as window 26) that is disposed adjacent to the vehicle A-pillar 37 and above a rear-view mirror 39 (shown in FIG. 2A).

In the illustrated example, the image generator 30 and the reflector 36 are located under the cockpit cover 38. The image generator 30 and the reflector 36 may be mounted to vehicle structure, such as a case 40. A lens 42 is disposed over an opening 44 in the case 40. The lens 42 may help prevent entrance of dust and light to the reflector 36 and image generator 30. The lens 42 is configured to permit rays of the generated image to pass through the lens 42 toward the display surface 26. Thus, the lens 42 may be transparent or translucent.

The main HUD 18 is located adjacent to the instrument cluster 46, behind the instrument cluster 46 and steering wheel 20 as viewed from the interior 16 of the vehicle 10. The main HUD 18 is configured to projector vehicle information as a virtual image 48 onto or through the front windshield 50. As generally understood, the front windshield 50 is disposed at an angle α with respect to each of the side windows 26, 28. The angle α could be any desired angle, but is typically in the range of about 90-135 degrees, sometimes up to 165 degrees, depending on the curvature of the front windshield 50.

An air duct 49 for heating and cooling is disposed under the cockpit cover 38, with a vent 51 for controlling air flow through an opening 53 of the air duct 49. The SHUD system 12 is disposed under the cockpit cover 38 in a location that avoids interference with the air duct 49. In other words, the SHUD system 12 is spaced apart from the air duct 49, and at least a substantial number the rays of the generated image (which create the virtual image 21) do not intersect with the air duct 49.

The side HUD system 12, including a side display surface thereof, may be disposed along one or both of the vehicle sides 22, 24. The "side display surface" is the surface through which the virtual image 21 is projected. The side display surface could be a surface disposed adjacent to one of the side windows 26, 28, or the side display surface could be the windows 26, 28 themselves, which are typically located on the vehicle doors 31. The side display surface could be curved or flat.

Figure 2C:
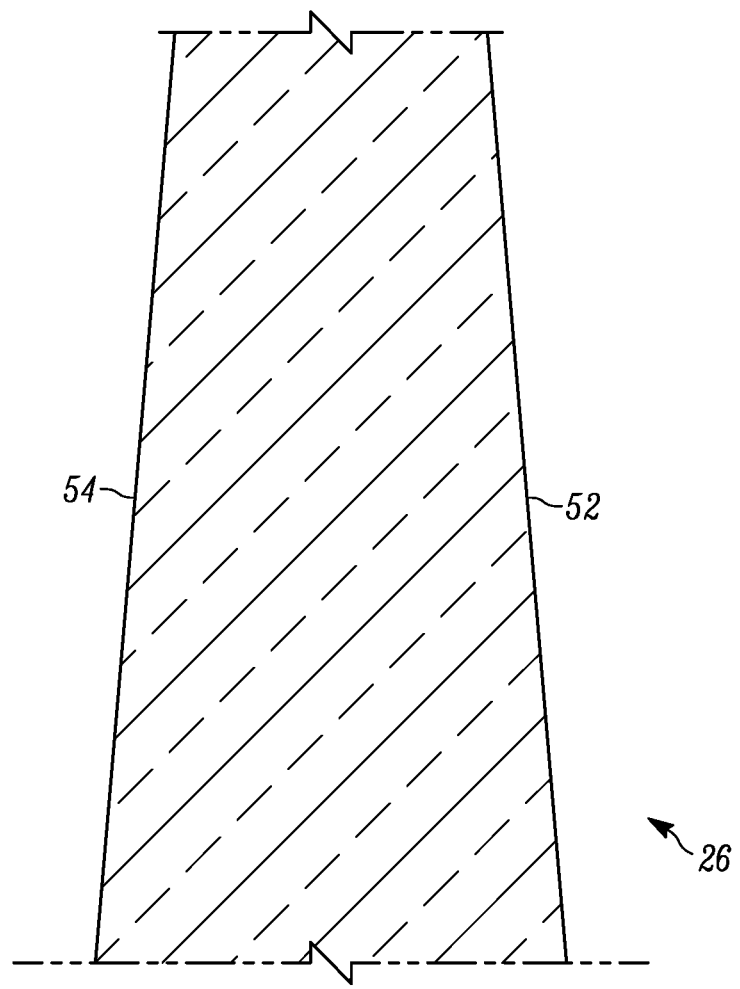
FIG. 2C is a cross-sectional view of a portion of a side display surface of the side head-up display system of FIGS. 1-2B, according to the principles of the present disclosure.

In some forms, the window 26, 28 or other side display surface has a wedged shape wherein an inner surface 52 of the side display surface is non-parallel with an outer surface 54 of the side display surface (see FIG. 2C). Such non-parallel surfaces 52, 54 of the side display surface (window 26, in this example) allows images, such as the virtual image 21, to be projected onto the display surface 26 without creating a double image.

Though the description herein is mainly directed toward the driver's side portion 58 of the side HUD system 12, it should be understood that an identical or similar portion of the side HUD system 12 could be applied on the passenger's side 24. To that end, the description herein as applied to the driver's side portion 58 of the SHUD 12 portion applies equally to the passenger's side portion 60 of the SHUD system 12. For example, the SHUD system 12 could include a second image generator configured to emit a second generated image for viewing by the driver or passenger in the form of a virtual image on or through the passenger's side window 28 or other display surface disposed on the passenger's side 24 of the vehicle 10. In some variations, however, only one of the passenger's side portion 60 and the driver's side portion 58 of the SHUD system 12 could be implemented. Thus, it is contemplated that some versions will not include the passenger's side portion 60, for example.

The side HUD system 12 may include a controller, shown schematically as element 56 in FIG. 1. The controller 56 is operably coupled to the driver's side portion 58 and the passenger's side portion 60 (if there is one). The controller 56 may be configured to cause the image generator 30 to generate the generated image intermittently so that the PGU 32 and TFT 34 are not "always on" during vehicle operation. In other words, the image generator 30 may be configured to be turned off and show nothing at least some of the time during operation of the vehicle 10, while the vehicle 10 is running and/or moving. Since the image generator 30 need not always be turned on, the SHUD system 12 can be sized much smaller than the main HUD 18 because the SHUD system 12 will not require a large heat sink that would be needed by the main HUD 18, which is typically "always on" during vehicle operation. A much smaller heat sink can then be used for the SHUD system 12 than with the main HUD system 18.

Figure 3A:
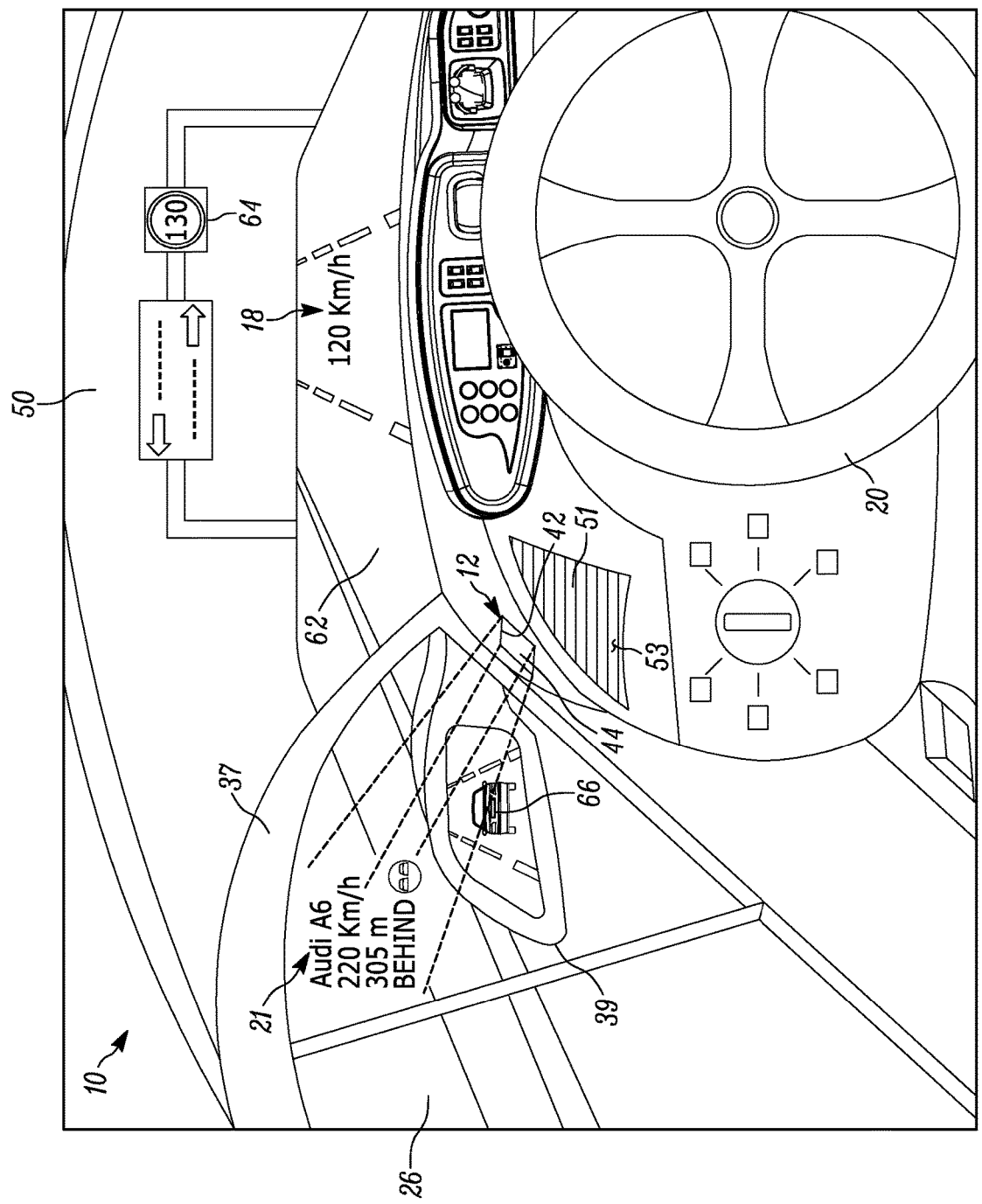
FIG. 3A is a schematic side view, from an interior side, of a portion of the motor vehicle and the side head-up display system of FIGS. 1-2B, showing information regarding an approaching vehicle, in accordance with the principles of the present disclosure.
Figure 3B:
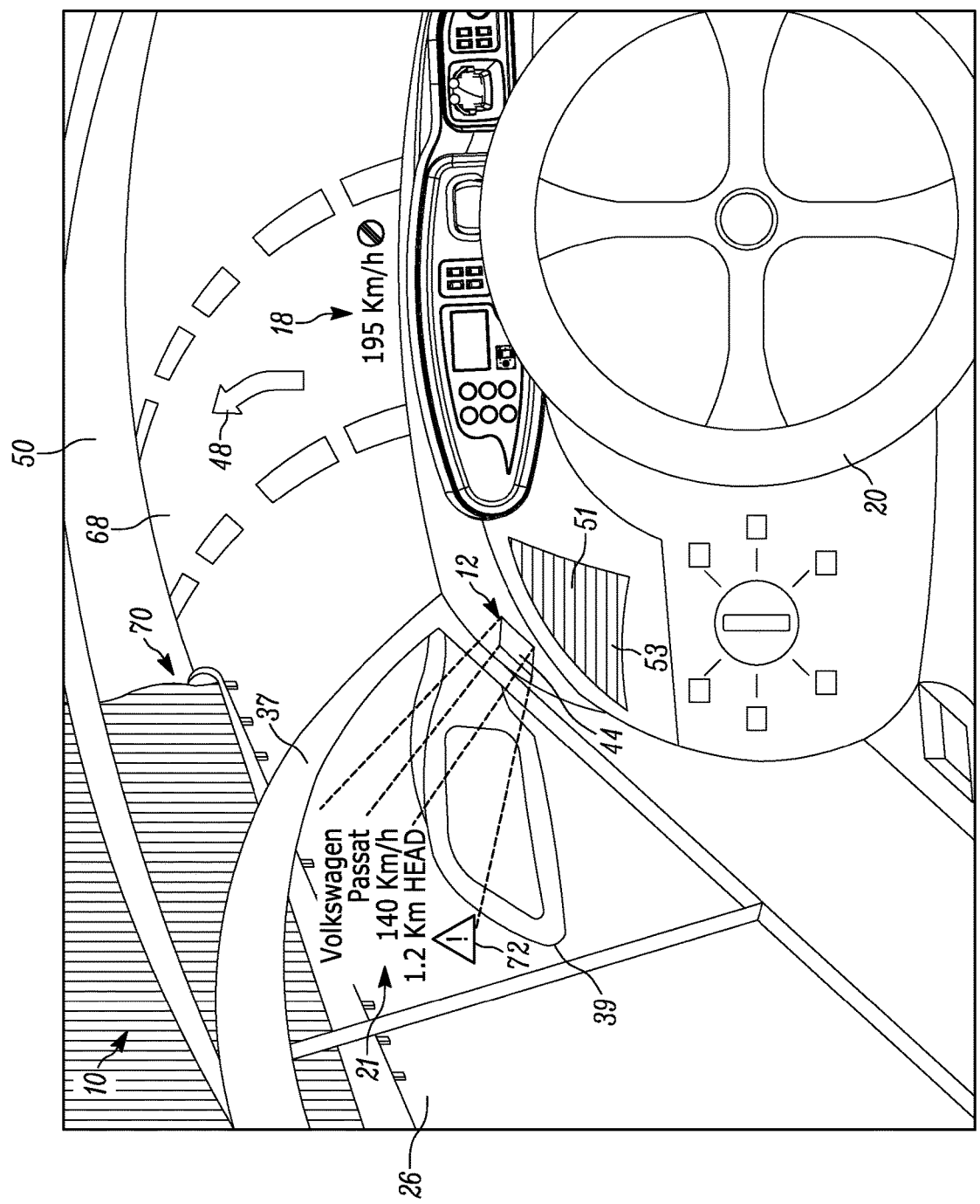
FIG. 3B is a schematic side view, from an interior side, of a portion of the motor vehicle and the side head-up display system of FIGS. 1-2B and 3A, showing information regarding a slower-moving vehicle located ahead of the motor vehicle, in accordance with the principles of the present disclosure.
Figure 3C:
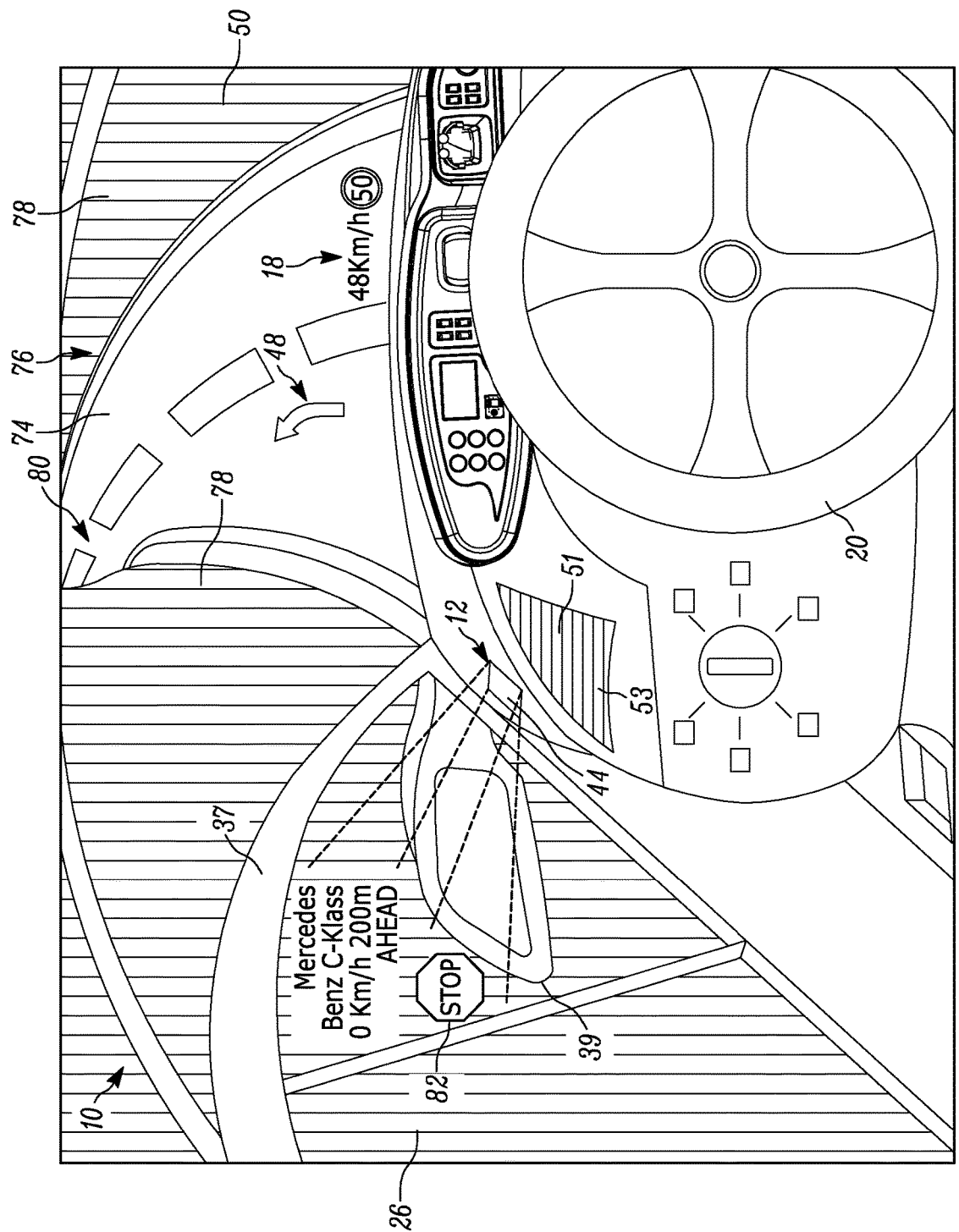
FIG. 3C is a schematic side view, from an interior side, of a portion of the motor vehicle and the side head-up display system of FIGS. 1-2B and 3A-3B, showing information regarding a stopped vehicle located ahead of the motor vehicle, in accordance with the principles of the present disclosure.

FIGS. 3A-3C show three different driving scenarios for the SHUD system 12. Referring now to FIG. 3A, the vehicle 10 is traveling on a road 62, which has speed limit of 130 km/h as shown on speed limit sign 64. The vehicle 10 is traveling at 120 km/h, as shown by the main HUD system 18 on or through the front windshield 50.

The controller 56, which is electrically connected to the side HUD system 12, as shown in FIG. 1, is configured to cause the image generator 30 of the SHUD system 12 to show speed information for another vehicle 66 approaching on the driver's side 22 above a predetermined speed threshold, or approaching at any speed. In some forms, the controller 56 is configured to cause the SHUD system 12 to show speed information for the other vehicle 66 if the other vehicle 66 is traveling faster than the vehicle 10. In other words, in some forms, the predetermined speed threshold for the other vehicle 66 that would cause the controller 56 to activate the SHUD system 12 may depend on the speed of the vehicle 10.

In the illustrated embodiment, the other vehicle 66 (seen in the rearview mirror 39) is approaching the vehicle 10 at a speed of 220 km/h. The SHUD system 12 is configured to illustrate the speed information for the other vehicle 66 on or through the driver's side window 26 or other side display surface to form the virtual image 21 of the SHUD system 12. Thus, the driver 14 of the vehicle 10 can be warned that a vehicle 66 is approaching, and in this case, at a much faster speed.

In some forms, the controller 56 is configured to cause the image generator 30 to generate an image to show information including that the other vehicle 66 (or any other vehicle—not shown) is in the blind spot of the motor vehicle 10. Therefore, the virtual image 21 provides a warning to the driver 15 that a vehicle is in the blind spot of the vehicle 10.

Referring now to FIG. 3B, the vehicle 10 is traveling on a road 68, which has an upcoming curve 70. The main HUD system 18 shows the driver that the curve is approaching in the virtual image 48 of the main HUD system 18. The vehicle 10 is traveling at 195 km/h, as shown by the main HUD system 18 in the virtual image 48 through the front windshield 50.

The controller 56, which is electrically connected to the side HUD system 12, as shown in FIG. 1, is configured to cause the image generator 30 of the SHUD system 12 to show location and/or speed information of another vehicle (not shown) that is traveling at a slower speed ahead of the vehicle 10 and hidden beyond the curve 70 in the road 68. The other vehicle (not shown) may be ahead on the driver's side 22 or directly in front of the vehicle 10, by way of example. In this case, the virtual image 21 of the side HUD system 12 shows that the vehicle ahead (not shown) is located 1.2 km ahead and is only traveling 140 km/h, as compared to the 195 km/h that the vehicle 10 is traveling. The virtual image 21 includes a warning symbol 72 in order to warn the driver 14 that he/she should proceed with caution ahead, and/or slow down to avoid a collision with the slower vehicle ahead.

Referring now to FIG. 3C, the vehicle 10 is traveling on a curved road 74 in a tunnel 76, which has low long-range visibility because the tunnel walls 78 block the driver's ability to see very far ahead of the vehicle 10. The illustrated example shows that the vehicle 10 is traveling at 48 km/h and the speed limit is 50 km/h, as shown on the main HUD system 18, with a curve 80 approaching.

As described above, the controller 56, which is electrically connected to the side HUD system 12, as shown in FIG. 1, may be configured to cause the image generator 30 of the SHUD system 12 to show location and/or speed information of another vehicle (not shown). In this example, the controller 56 is configured to cause the image generator 30 to show information indicating that another vehicle (not shown) is stopped ahead of the motor vehicle 10.

In this case, the other vehicle that is stopped is hidden by the curve 80 and the tunnel walls 78. The virtual image 21 of the side HUD system 12 shows that the vehicle ahead (not shown) is located 200 meters ahead and is traveling 0 km/h—completely stopped. The virtual images 21 shows a warning "stop" symbol 82 in order to warn the driver 14 that he/she should proceed with caution ahead.

In versions of the SHUD system 12 that include a second portion 60, the controller 56 is configured to cause the image generator of the second portion 60 to generate the second generated image to create a second virtual image for viewing through the passenger's window 28 when another vehicle is approaching or being approached, or in the blind spot, on the passenger's side 24 of the vehicle 10. FIGS. 3A-3C could be applied to the second portion 60 when another vehicle is ahead of or approaching the vehicle 10 on the passenger's side or directly in front of the vehicle.

The controller 56 may include a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the algorithm for operating the side head-up display system 12 and/or the main HUD system 18, as described herein. The interface facilitates communication with the other systems or components of the vehicle 10. In some examples, the controller 56 may be a portion of the vehicle control system, another system, or a stand-alone system.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A head-up display system for a motor vehicle having a front windshield and a pair of vehicle side windows, each vehicle side window being disposed at an angle with respect to the front windshield, the head-up display system comprising:
   a main HUD system configured to project a main virtual image onto a windshield for the motor vehicle and in the line of sight of an operator of the motor vehicle, said projected main virtual image appearing to be located at a point, P, which is outside and in front of the vehicle;
   a side HUD system, configured to project side virtual images onto the side windows concurrent with the main virtual image, the side HUD system comprising:
      a side window having a side display surface onto which said side virtual images can be projected and seen;
      a side window image generator configured to emit a side generated image to create a side virtual image on said side window, the side virtual image being visible by a vehicle occupant on said side window; and
   wherein the side virtual image is based on the generated image, the side virtual image being viewable on the side window surface at the same time as the main virtual image appears at the point P.

2. The side head-up display system of claim 1, further comprising a reflector configured to reflect rays of the side generated image toward the side display surface to create the side virtual image.

3. The side head-up display system of claim 2, wherein the reflector is configured to reflect the rays about 90 degrees.

4. The side head-up display system of claim 2, further comprising a lens disposed adjacent to the reflector, the lens being configured to permit the rays of the side generated image to pass through the lens toward the side display surface.

5. The side head-up display system of claim 4, wherein the side image generator comprises a thin-film transistor (TFT) display mounted to a picture generation unit (PGU).

6. The side head-up display system of claim 5, wherein the side window has a wedged shape comprising an inner side and an outer side, the inner and outer sides being non-parallel.

7. The side head-up display system of claim 6, further comprising a controller configured to cause the side generated image to be generated intermittently while the motor vehicle is running so that the side image generator is off at least part of the time while the motor vehicle is running.

8. The side head-up display system of claim 7, the controller being configured to cause the side image generator to create the side generated image to show speed information for another vehicle approaching above a predetermined speed threshold.

9. The side head-up display system of claim 8, wherein the predetermined speed threshold depends on a speed of the motor vehicle.

10. The side head-up display system of claim 8, the controller being configured to cause the side image generator to create the side generated image to show information indicating that another vehicle is in the blind spot of the motor vehicle.

11. The side head-up display system of claim 10, the controller being configured to cause the side image generator to create the generated image to show information indicating that another vehicle located ahead of the motor vehicle is traveling slower than the motor vehicle.

12. The side head-up display system of claim 11, the controller being configured to cause the side image generator to create the side generated image to show information indicating that another vehicle is stopped ahead of the motor vehicle.

13. The side head-up display system of claim 11, the side virtual image being visible to the vehicle occupant through a portion of the side display surface that is disposed adjacent to an A-pillar and above a rear-view mirror.

14. The side head-up display system of claim 13, the side image generator being a first side image generator, the side generated image being a first side generated image, the side display surface being a first side display surface, the side virtual image being a first side virtual image, and the vehicle side being a first vehicle side of the pair of vehicle sides, the side head-up display system further comprising a second side image generator configured to emit a second side generated image to create a second side virtual image for viewing by a vehicle occupant and a second side display surface disposed along a second vehicle side of the pair of vehicle sides, wherein the second side virtual image is based on the second side generated image, the second side virtual image being viewable through the second side display surface, the first side display surface being located on a driver's side of the motor vehicle, and the second side display surface being located on a passenger's side of the motor vehicle.

* * * * *